June 21, 1949.                D. P. LAVIETES                2,473,715
                               SMOKER'S PIPE
                            Filed Nov. 23, 1944
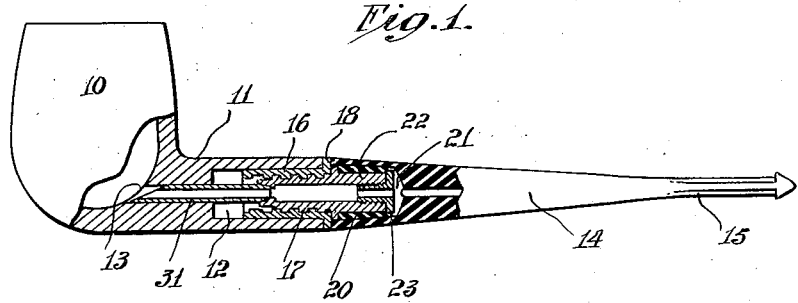
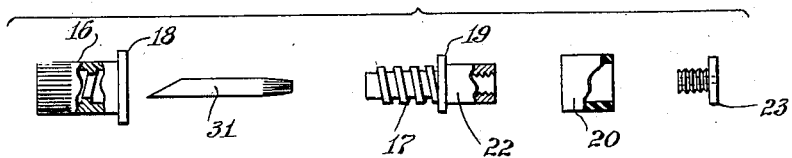

Patented June 21, 1949

2,473,715

UNITED STATES PATENT OFFICE 2,473,715

SMOKER'S PIPE

David P. Lavietes, Brooklyn, N. Y.

Application November 23, 1944, Serial No. 564,760

2 Claims. (Cl. 131—225)

The invention relates to smokers' pipes and more particularly to smokers' pipes having a screw threaded connection between the bit or stem and the shank of the pipe bowl to form a gas and moisture tight joint between these parts, and yet allow the bit or stem to be turned to correct any departure from a desired position of the bit relative to the bowl, or "overturning" of the bit, as a result of lack of accuracy of, or wear of, the connecting parts.

In smoking a pipe, there is always developed a certain amount of moisture which is precipitated and accumulated within the shank or the bit in volume to require frequent removal of the bit and cleaning of parts. To prevent seepage of the precipitate about the joint between the shank and the bit and the fouling of the fingers of the user, a gas and liquid tight joint between the abutting ends of the shank and the bit is necessary.

Generally speaking, two practices have been followed in securing a bit or stem to the bowl shank; one the use of a "push bit" in which a tenon is formed integrally with or mounted upon the end of the bit or stem and a socket is formed in the end of the bowl shank; the other the use of a screw threaded tenon formed integrally with, or mounted upon the end of the bit, and a complementary screw threaded socket formed in the end of the shank.

While with a "push bit" it is possible to make any desired adjustment of the bowl and the bit, it is so difficult to secure a tight, non-seeping joint that a liner for the shank socket of cork or other resilient material is frequently resorted to, but such a liner is apt to break down after a short use of a pipe following frequent removal and replacement of the bit, with a consequent loss of tightness in the fit between the tenon and the liner.

With a bit having a screw threaded connection with the shank of a pipe, a tight fit may be secured if the parts are accurately fitted although slight dimensional variations or wear upon the screw threads may result in a looseness of parts resulting in seepage of moisture or an overturning of the bit in an effort to correct this looseness. Such overturning of the bit causes a loss in the desired relative position of the bowl and the bite of the bit or stem.

With the above conditions in mind, I have produced a smoker's pipe wherein the bit or stem is removably secured to the shank of the bowl by a screw threaded connection, the action of which forms a tight joint between the end of the shank and the abutting end of the bit irrespective of slight dimensional variation in the parts, or wear thereof, even though in securing such joint, there may be overturning of the bit.

In a pipe embodying the invention, the bit may be turned independently of the screw threads, so as to correct any overturning thereof in securing a gas and moisture tight joint and to permit the bit to be positioned to establish any desired relation of the axis of the bowl to that of the flattened portion of the bit adjacent its bite, according to the habits or the fancy of, or the tilting of the pipe as a whole due to tooth irregularities of, the user.

Such adjustment may be made without disturbing the tight fit between the bit and the shank, and the construction is such that all parts may be standarized so as to permit the replacement of a broken bit and yet maintain the same conditions of operation of the pipe.

One part of the connection is fixedly secured to one of the pipe parts while the other part of the connection is secured to the other pipe part by a swivel joint permitting turning of one part of the joint and the pipe part carrying same in relation to the other part of the joint and the other part of the pipe with which it is connected.

The invention consists primarily in a smoker's pipe embodying therein a bowl having a shank provided with a socket opening outwardly thereof and a smoke passage leading therefrom into the bowl, a bit having a flattened bite, and a connection between said shank and said bit consisting of a part having an interiorly screw threaded socket and a part having an exteriorly screw threaded tenon whereby the bit is removably connected with the shank, one of the parts of said connection being fixedly connected to one of the pipe parts and the other part of said connection being secured to the other pipe part by means permitting turning of one pipe part relatively to the other independently of said screw threads; and in such other novel features of construction and combination of parts suitable for commercial production as are hereinafter set forth and described and more particularly pointed out in the claims hereto appended.

Referring to the drawings,

Fig. 1 is a side view and partial section of a smoker's pipe embodying the invention.

Fig. 2 is an exploded view partly in section of the parts for connecting the bit and the bowl shank.

Like reference numerals refer to like parts throughout the several views.

In the embodiment of the invention shown in the drawings, the pipe has a bowl 10 and an integral shank 11 which may be made of briar wood. Opening outwardly of an end of the shank 11 is a socket opening 12 the inner end of which is connected with the bore of the bowl 10 by a smoke passage 13. The bit or stem of the pipe may be made of hard vulcanized rubber, a plastic or any other desired material suitable for the purpose.

The present invention resides in a pipe of the above character wherein the bit 14 is connected with the shank 11 by means of screw threads so as to permit the abutting ends of the shank and of the bit to be drawn together with sufficient force to form a seal against the seepage of gases and moisture to the exterior of the shank and the bit, while at the same time permit the bit to be turned if desired in excess of the amount required to form the seal so that the user may adjust the relative positions of the bowl and the flattened portion 15 at the bite of the bit after the seal has been formed and without disturbing the effectiveness of the seal. In forming an effective seal, the portion 15 of the bit may be brought to a position beyond a plane at right angles to the axis of the bowl because of the turning movement of the bit required to form the seal. This is known as "overturning" of the bit, and with an ordinary screw tenon bit there is no way of correcting this condition except by a reverse bit movement which results in at least a partial loss of an effective seal and possible seepage of precipitated moisture therethrough.

To permit correction of "overturning" of a bit, I employ a connection between the bit 14 and the shank 11 consisting of a tubular interiorly screw threaded sleeve 16 carried by on of the pipe parts for instance, the shank 11, and a tubular exteriorly screw threaded tenon 17 carried by the other pipe part and co-operating therewith. The sleeve 16 has an end flange 18 overlapping and engaging the outer end of the shank 11 and the tenon 17 has a flange 19 adapted to be countersunk in, so as to be substantially flush with, the end of the bit 14 and which abuts against the flange 18 which latter forms a facing for the end of the shank.

One of the parts of the connection, such as the sleeve 16, is fixedly secured to one of the pipe parts as within the socket 12 of the shank 11, by a drive fit and a milled surface or by means of a suitable cement, with its flange 18 closely abutting and covering the end of the shank; and the other part of the connection, the screw tenon 17, is secured to the other pipe part, the bit 14, in a manner to permit the turning of the screw tenon to form a seal between the end covering of the shank and the abutting end of the bit, and also the turning of the bit after the formation of the seal, to set the bowl 10 in relation to the bit, or to adjust the bit if turning of the tenon in forming the seal, results in overturning of the bit.

This adjustability results from the securing of the bit in relation to the tenon by a swivelling connection between the bit and the tenon so as to permit turning of the bit with or independently of the tenon. One part of the connection is fixedly secured to the bit and has a tight friction fit with the tenon, offering such resistance to the turning of the bit independently of the tenon as to only permit such movement of the bit following the abutting engagement of the end of the bit and the end of the shank.

In the event of wear upon the screw threads of the sleeve 16 or the tenon 17, or slight variation in the length of the shank 11 or the bit 14, which may occur in different pipes, the amount of turning movement of the bit to form the seal between the shank and the bit may vary, but the screw threads will always bring the end of the bit against the end of the shank to form a tight seal and take up any wear of the threads although in so doing the bite of the bit 14 may be positioned obliquely to the plane of the axis of the shank to a greater or less extent. This, however, can be corrected by continued turning of the bit.

The connection between the tenon and the bit consists of a friction sleeve 20 cemented or otherwise fixedly secured within a socket 21 in the end of the bit. A cylindrical bearing 22 projecting from the flange 19 of the tenon has a close friction fit in the sleeve 20. To prevent removal of the bearing 22 from the sleeve 20, I provide a headed screw 23 or shoulder element engaging the end of the bearing 22 and engaging the end of the sleeve 20, so as to confine the sleeve 20 between the head of the screw 23 and the flange 19.

The sleeve 20 may be made of any suitable plastic or other friction material which may be readily molded or formed, and cemented to the material of the bit. It is obvious that with the use of different materials in the bit, it may be desirable to use different materials in the sleeve 20 and different cements, but any selected material for said sleeve must be capable of developing frictional resistance to the turning of the bit independently of the tenon movement to cause the tenon to turn with the bit until an effective seal is formed between the abutting ends of the bit and the shank.

A tube 31 may be used to form a liner for the smoke passage 13.

The essential characteristic of a pipe embodying the invention is the attachment of the bit and the shank by means of a screw threaded socket and a co-operating screw threaded tenon, one of these members being fixedly secured to one pipe part and the other member being connected to the other pipe part by a friction, swivelling, connection so that turning of the bit will cause said screw threaded members to bring the ends of the shank and of the bit in such close abutting relation irrespective of the quantity of turning movement required, to form a tight seal, and the bit may have continued turning movement to correct any overturning of the bit or to adjust the bowl and the bit to establish a desired relative angle of the bowl and the bite of the bit.

While I have shown a single embodiment of the invention, it is obvious that the pipe structure is capable of further variation while still having the necessary functions and sequence of operations herein described.

In producing a pipe in accordance with the form of the invention shown, the tubular sleeve 16 is forced into the socket 12 of the shank 11 until its flange 18 closely abuts against and overlays the end of the shank. The milling or roughness on the sleeve alone may be relied upon to prevent turning of the sleeve in the shank, or cement may be used in connection with the exteriorly roughened surface of the socket sleeve.

The friction sleeve 20 is forced onto the bearing 22 and the screw 23 tightened to confine the sleeve 20 between the head of the screw and the tenon flange 19. The assembled tenon structure is then forced into the socket 21 until its flange 19 rests in the countersink in the end of the bit. If desired, the flange 19 may be flush with or slightly within the end of the bit. Cement, or a solvent for the material of the sleeve 20 may be used to fixedly secure the sleeve to the bit when thus applying it, or if the material of the sleeve be such as to fuse under heat, the bit may be subjected to heat after the tenon assembly has been positioned in the bit so as to prevent the tenon assembly from being withdrawn axially of the bit.

In the form of the invention shown, the arrangement and construction of parts is such that no definite turning of the bit is required to form a tight seal between the abutting ends of the shank and the bit, and the bit may have indefinite turning movement independently of that required to form the seal for the purpose of correcting the set of the bit as heretofore described.

With a screw socket and tenon connection, one bit may be used to replace another, since the operation immediately above referred to, will permit adjustment of parts to compensate for dimensional variation in different bits.

It is not my intention to limit the invention to the precise details of construction shown in the accompanying drawings, since it is obvious that in adapting the invention to pipes of different styles, such may be varied without departing from the spirit and scope of the invention.

Having described the invention, what I claim as new and desire to have protected by Letters Patent is:

1. A smoker's pipe comprising a bowl, a shank therefor having a socket portion, a bit having a recess at one end and a flat bite at its other end, an internally screw-threaded sleeve secured in said socket portion and having an annular flange at one end thereof in engagement with the end face of said shank, friction means, means permanently securing said friction means to the wall of said recess, a tenon fitting including a cylindrical portion extending through said friction means, an externally screw-threaded portion and an annular flange between said portions, a shoulder element on the inner end of said cylindrical portion engaging the inner end of said friction means for preventing withdrawal of said fitting from the recess, the externally-threaded portion of said fitting being threaded into said internally screw-threaded sleeve, the face of the flange of said tenon fitting engaging the face of the annular flange on the internally screw-threaded sleeve, the friction between the cylindrical portion and the friction means being greater than the friction between the threaded portions whereby the bit with its tenon fitting may be threaded into and out of the shank, the friction between the threaded portions and between the flange faces when in engagement being greater than the friction between the cylindrical portion and the friction means whereby the bit may be turned relative to the tenon fitting to adjust the position of the bit relative to the bowl.

2. A smoker's pipe comprising a bowl having a shank with a socket and a smoke passage, a bit having a flattened bite at one end and a recess at its other end and a smoke passage, adjustable connecting means between the bit and the shank of the bowl comprising an internally screw-threaded member fixed in the socket of the shank of the bowl and having a flange abutting against the end of the shank around the rim of the socket, and an externally screw-threaded member mounted in the recess in the bit for seating in the internally screw-threaded member of the shank, said externally screw-threaded member having a flange engaging the flange on the internally screw-threaded member when the parts are assembled, and a cylindrical portion, friction means surrounding and frictionally engaging said cylindrical portion within said recess, means permanently securing said friction means to the wall of the recess, and an element secured to said externally screw-threaded member and having a shoulder engaging said friction means and preventing withdrawal of said externally screw-threaded member from said friction means.

DAVID P. LAVIETES.

REFERENCES CITED

The following references are of record in the file of this patent:

UNITED STATES PATENTS

| Number | Name | Date |
| --- | --- | --- |
| 1,908,630 | Stern | May 9, 1933 |
| 2,262,159 | Lavietes | Nov. 11, 1941 |
| 2,317,180 | Daignault et al. | Apr. 20, 1943 |
| 2,326,658 | Koenigsamen | Aug. 10, 1943 |

FOREIGN PATENTS

| Number | Country | Date |
| --- | --- | --- |
| 1,898 | Great Britain | 1890 |
| 18,876 | Great Britain | Nov. 3, 1910 |